United States Patent [19]

Uchida et al.

[11] 4,454,843

[45] Jun. 19, 1984

[54] AUTOMATIC ENGINE STOP AND START SYSTEM

[75] Inventors: Shigekatsu Uchida; Takao Akatsuka; Takahide Kawamura, all of Aichi, Japan

[73] Assignee: Toyota Jidosha Kogyo Kabushiki Kaisha, Aichi, Japan

[21] Appl. No.: 363,544

[22] Filed: Mar. 30, 1982

[30] Foreign Application Priority Data

Jul. 27, 1981 [JP] Japan .................................. 56-117250

[51] Int. Cl.³ .............................................. F02N 17/00
[52] U.S. Cl. .......................... 123/179 B; 123/179 BG; 123/179 G; 123/198 DC; 123/198 DB
[58] Field of Search ..... 123/198 F, 198 DB, 198 DC, 123/179 B, 179 BG, 179 G

[56] References Cited

U.S. PATENT DOCUMENTS

| 3,872,316 | 3/1975 | Kurii et al. ........................ | 123/179 B |
| 4,022,164 | 5/1977 | Fuchs ............................... | 123/198 F |
| 4,192,279 | 3/1980 | Maisch et al. .................... | 123/198 F |
| 4,286,683 | 9/1981 | Zeigner et al. .................... | 123/179 B |
| 4,364,343 | 12/1982 | Malik ............................... | 123/179 B |
| 4,402,286 | 9/1983 | Pagel et al. ...................... | 123/179 B |

Primary Examiner—Ira S. Lazarus
Attorney, Agent, or Firm—Oblon, Fisher, Spivak, McClelland & Maier

[57] ABSTRACT

Determination as to whether the condition of automatically stopping an engine is formed or not is made based on outputs from pluralities of sensors and switches for detecting the operating conditions of various portions of a vehicle. Even if the result of determination satisfies the conditions of automatic stop, automatic stop is not effected when the temperature of the engine cooling water exceeds predetermined temperature limits.

4 Claims, 2 Drawing Figures

AUTOMATIC ENGINE STOP AND START SYSTEM

BACKGROUND OF THE INVENTION

1. Field of the Invention

This invention relates to improvements in an automatic engine stop and start system for automatically stopping and starting an engine in accordance with the operating conditions.

2. Description of the Prior Art

Some of the motor cars are equipped with automatic engine stop and start systems capable of automatically stopping the engine when the motor car stops at a cross-roads or the like during running through a town and of starting the engine by an ordinary departing operation (depressing of a clutch pedal, for example) at the time of restarting the engine. Equipping the motor cars with such systems as described above makes it possible to reduce the exhaust gases in volume and the consumption of fuel, as the engines are operated when deemed necessary.

To improve the safety, driverability and the like, there are provided conditions on which the automatic stop of the engine is prevented. More specifically, when any of the following data is obtained, the automatic stop of the engine shall not be performed.

(i) When a right turn signal is being issued.

In the case of waiting a right turn at the center of a cross-roads, if the engine is stopped, then restart lacks quick responsiveness. Consequently, this phenomenon is prevented from occurring.

(ii) When a cooler, head lamps, defogger, or a wiper is used.

When the electric energy being used is high the wear of a battery becomes heavy, whereby it becomes difficult to restart the engine. Consequently, this phenomenon is prevented from occurring.

(iii) When the temperature of the engine cooling water is off.

When the engine is stopped in a condition close to an overheat, it becomes difficult to restart the engine. Consequently, this phenomenon is prevented.

(iv) When an accelerator pedal is depressed, or when a clutch pedal is slightly depressed, while the vehicle is stopped after the automatic engine stop and start system has been set.

This is a measure for not losing the quick responsiveness when the stopping time is very short such for example as a temporary stop at a cross-roads where a traffic signal is working and a temporary stop during slow running condition.

Out of the above-described reasons for preventing the automatic engine stops, the prevention of the automatic engine stop by a thermosensor at a high temperature (105° C. or more, for example) of the engine cooling water is aimed at the protection for components and parts due to the ill effect of heat. However, the generation of ill effect of heat of the temperature of the engine cooling water is not limited to the high temperature range but reaches a wide temperature range. For example, measures are required even in the low temperature range for remedying the problem of restart of the engine.

SUMMARY OF THE INVENTION

The present invention has as its object the provision of an automatic engine stop and start system wherein the restart performance of an engine is improved.

According to the present invention, when the temperature of the engine cooling water remains within a predetermined high temperature range or a low temperature range, the function of the automatic stop and start is precluded, so that the engine can avoid stopping in operation, thereby improving the restart performance.

DETAILED DESCRIPTION OF THE INVENTION

Figure 1:
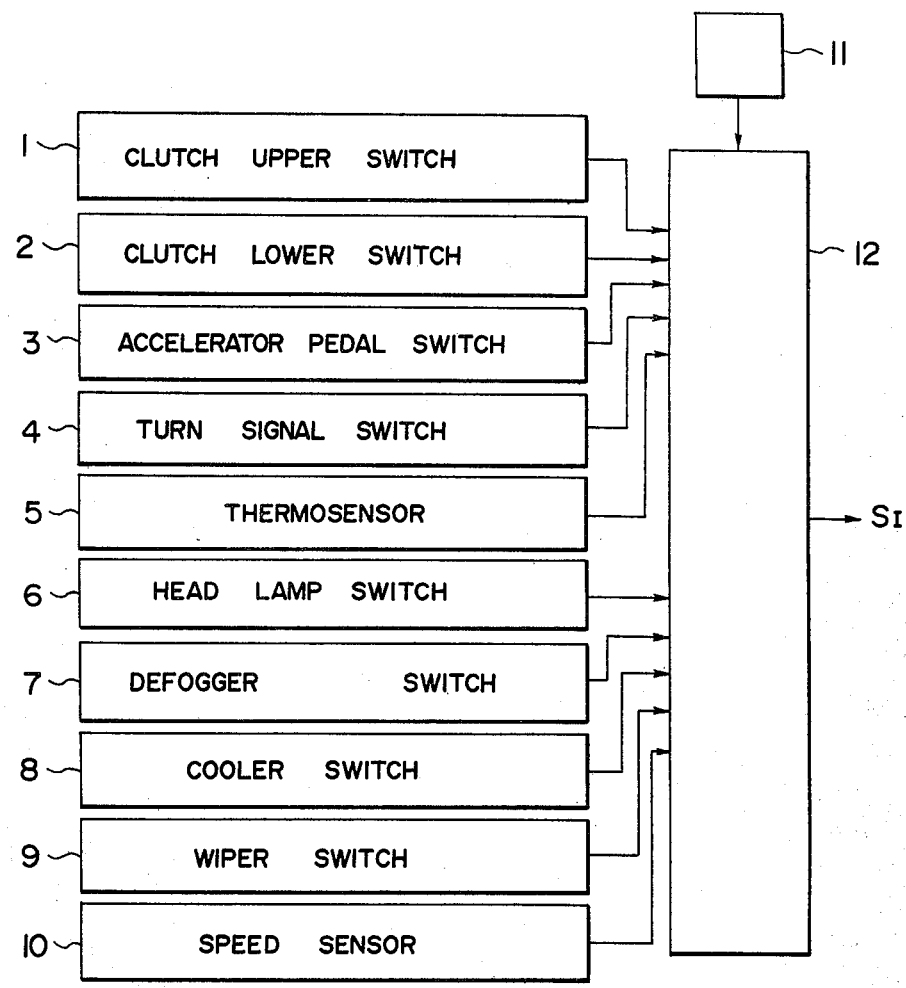
FIG. 1 is a block diagram showing an embodiment of the present invention.

Referring to FIG. 1, data for precluding the function of the automatic stop and start, i.e., allowing the engine to continue rotation are obtainable from respective switches and sensors including a clutch upper switch 1 to be turned "ON" when a clutch pedal is lightly depressed, a clutch lower switch 2 to be turned "ON" when the clutch pedal is fully depressed, an accelerator pedal switch 3 to be turned "ON" when an accelerator pedal is depressed, a turn signal switch 4 to be turned "ON" when a turn signal is issued, a thermosensor 5 for detecting the temperature of the engine cooling water, a head lamp switch 6 to be turned "ON" when head lamps are turned "ON", a defogger switch 7 to be turned "ON" when defogger, are turned "ON", a cooler switch 8 to be turned "ON" when a cooler is operated, a wiper switch 9 to be turned "ON" when a wiper is operated in a continuous mode, a vehicle speed sensor 10 for detecting the vehicle speed, and in addition to the aforesaid switches and sensors, an engine rotation detecting circuit 11 for issuing engine rotation data. Output signals from these switches, sensors and circuit are taken into an electronic control unit 12 where determination is made as to whether a condition of precluding automatic stop is generated or not based on the signals taken in. A microcomputer or a specially prepared circuit may be used as the electronic control unit 12. The conditions of the determination made by the electronic control unit 12 are based on the facts that the signals thus taken in corresponds to any one of the abovedescribed items (i)–(iv). Even if the result of determination satisfies the condition of automatic stop, the function of automatic stop is cut when the thermosensor 5 issued an output signal which indicates the temperature of the engine cooling water remains within a predetermined high temperature range or a low temperature range. In this case, an automatic stop precluding command $S_f$ is used for precluding fuel cut or continuing to energize an ignition coil.

Figure 2:
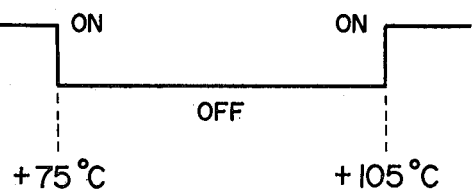
FIG. 2 is an output characteristics curve diagram of the thermosensor according to the present invention.

The thermosensor 5 has characteristics shown in FIG. 2, and is adapted to be turned "ON" below 75° C. or to be turned "ON" above 105° C., for example. Setting of the temperature range as described above is desirably selected in consideration of the start performance of the engine and the degree of the adverse effect of heat.

As described above, the automatic stop precluding function is provided in the low temperature range in addition to the high temperature range, whereby the restart performance of the engine is improved, so that the cranking time of the starter can be shortened, and moreover, a battery can be protected.

Various devices can be usable as the thermosensor 5, including a sensor utilizing the variation in value of resistance such as a thermistor, or a sensor or a switch in which an output signal is turned "ON" or "OFF". Furthermore, the temperature, at which an output signal of the sensor is generated, can be suitably determined based on the specification of the engine and other conditions.

What is claimed is:

1. An automatic stop and start system for an engine of a motor vehicle for stopping the engine under a predetermined operating condition, comprising:
    a first sensing means for sensing when the motor vehicle is making a turn across an opposite lane and for generating a corresponding output signal;
    a second sensing means for sensing an additional electrical load and for generating a corresponding output signal;
    a thermistor for sensing the temperature of engine coolant, said thermistor generating an "ON" signal when the sensed temperature is lower than a first predetermined temperature or higher than a second predetermined temperature which is higher than the first predetermined temperature; and
    an electronic control unit which stops the engine under a predetermined operating condition, but does not stop the engine even under a predetermined operating condition when said first or second sensing means generates said output signals when said thermistor generates said "ON" signal.

2. An automatic engine stop and start system as claimed in claim 1, wherein said first predetermined temperature is substantially 75° C.

3. An automatic engine stop and start system as claimed in claim 1, wherein said second predetermined temperature is substantially 105° C.

4. An automatic engine stop and start system as claimed in claim 1, wherein said predetermined operating condition includes that the motor vehicle stops for a time longer than a predetermined time.

* * * * *